United States Patent [19]

Huet et al.

[11] Patent Number: 4,760,611

[45] Date of Patent: Aug. 2, 1988

[54] ARMOR ELEMENTS AND METHOD

[75] Inventors: Roger Huet, Grenoble; Philippe Perrier, Meylan, both of France

[73] Assignee: Aluminum Company of America, Pittsburgh, Pa.

[21] Appl. No.: 898,833

[22] Filed: Aug. 20, 1986

Related U.S. Application Data

[63] Continuation of Ser. No. 690,755, Jan. 11, 1985, abandoned.

[30] Foreign Application Priority Data

Jan. 12, 1984 [FR] France ................................ 84 00398

[51] Int. Cl.$^4$ .............................................. F41H 1/02
[52] U.S. Cl. ................................................... 2/2.5
[58] Field of Search ................................................ 2/2.5

[56] References Cited

U.S. PATENT DOCUMENTS

| 1,268,223 | 6/1918 | Eimer | 2/2.5 |
|---|---|---|---|
| 1,532,362 | 4/1925 | Bailey | 2/2.5 X |
| 3,324,768 | 6/1967 | Eichelberger | 89/36 |
| 3,395,067 | 7/1968 | Lane | 2/2.5 X |
| 3,634,889 | 1/1972 | Rolsten | 2/2.5 |
| 3,705,558 | 12/1972 | McDougal et al. | 109/84 |
| 3,793,648 | 2/1974 | Dorre et al. | 2/2.5 |
| 4,534,266 | 8/1985 | Huet | 164/110 X |

FOREIGN PATENT DOCUMENTS

| 2162692 | 6/1971 | Fed. Rep. of Germany | 2/2.5 |
|---|---|---|---|
| 2036267 | 8/1982 | United Kingdom | |

Primary Examiner—Louis K. Rimrodt
Attorney, Agent, or Firm—Daniel A. Sullivan; Douglas P. Mueller

[57] ABSTRACT

Armor element for protection against projectiles, formed by a core made of ceramic material covered with a metal envelope obtained by casting around the core a resilient alloy having high antiballistic efficiency.

The envelope is strongly prestressed at casting around the ceramic core in order to inhibit the fragmentation thereof under shock due to the impact of a projectile.

The invention can be applied to constructing flexible armor implements by assembling and hingedly interconnecting juxtaposed armor elements.

10 Claims, 5 Drawing Sheets

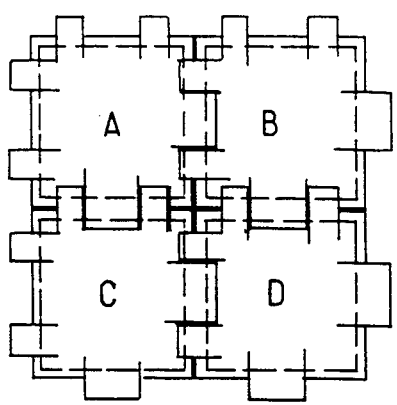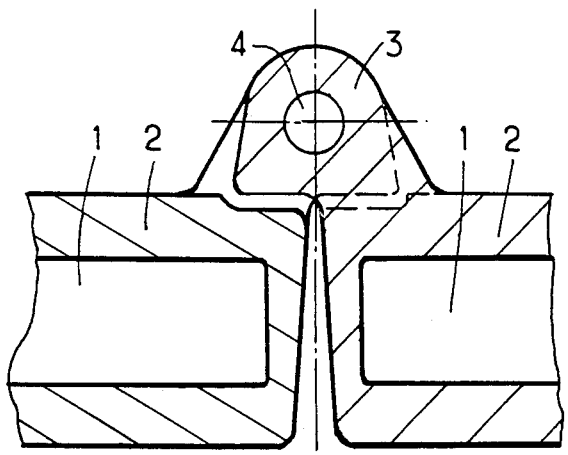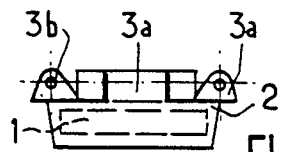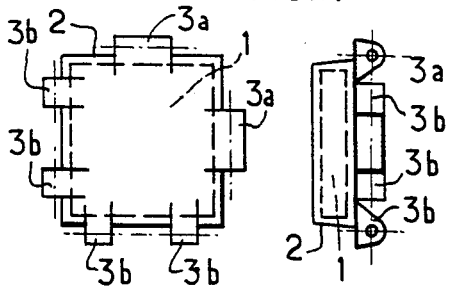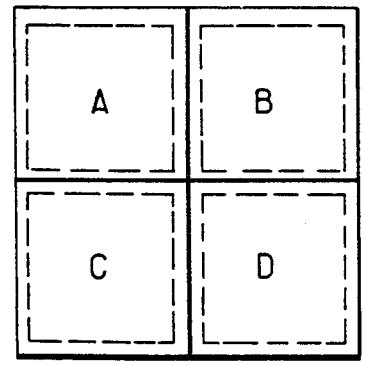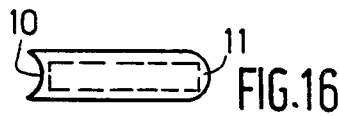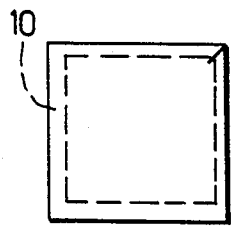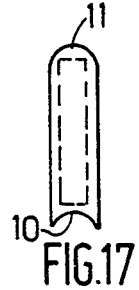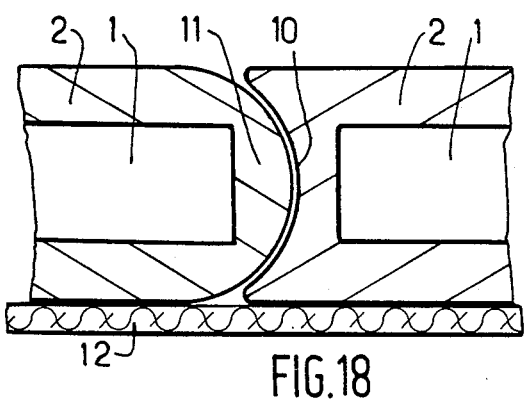

ARMOR ELEMENTS AND METHOD

This application is a continuation of U.S. application Ser. No. 690,755, filed Jan. 11, 1985, now abandoned.

BACKGROUND OF THE INVENTION

The present invention concerns shielding or armor elements providing protection against bullets or other projectiles, and it also concerns flexible shielding or armor implements constituted from such elements, in particular bullet-proof vests.

French Patent Specification No. 2,419,498 discloses a process of manufacturing composite metal pieces, comprising inserts made of ceramic material embedded in a metal shell and which have been disposed and positioned in a regular manner in the mold in order to ensure ballistic efficiency and provide between them channels for passage of the covering metal.

SUMMARY OF THE INVENTION

The armor elements of the present invention are obtained by a similar process. They are useful for manufacturing flexible armor surfaces and present high resistance to a penetrating impact such as that of an ogivally pointed bullet made of steel or another hard impact material. The armor elements thus obtained prove to be particularly light and shock-proof.

It is an object of the invention to provide an anti-projectile armor element comprising a ceramic core covered with a metallic envelope produced by casting all around said core a resilient alloy having a high anti-ballistic efficiency, such as an aluminum alloy, wherein said core is constituted by a planar ceramic piece, said envelope being cast around said core in such a manner that it produces an elevated prestress around said core to inhibit fragmentation of said core by the effect of the impact of a projectile.

Besides a single core, a variant of the invention has within a single envelope a plurality of cores in the form of rectangular or square ceramic pieces arranged, with small spacings (spacing preferably less than the diameter of the bullet to be defended against, preferably less than about 25%, or 10%, of the bullet diameter), in a checkerboard pattern. Also, there can be more than one plane of ceramic pieces in a single envelope; a second plane can be shifted, but still parallel, relative to the first, so that the pieces in the second plane cover the spaces between the pieces of the first plane.

In a preferred embodiment, the envelope is (at least on its substantially planar main faces) of a substantially uniform thickness and comprises on its lateral faces hinge lugs for hinged connection of said element to other similar elements, said lugs being molded integrally with said envelope.

Thus, this element furthermore comprises an envelope having on at least one of its substantially planar faces a substantially uniform or constant thickness. The envelope comprises hinge lugs hingedly connected to other identical armor elements, said lugs being molded integrally with the said envelope and being preferably provided with apertures while extending parallelly to the edges of the piece so as to be adapted to receive hinge members connecting said armor to said other armor elements.

Preferably the metal envelope is made of an alloy having good ballistic properties so as to be effective in braking the projectile, as well as its splinters after impact on the ceramic piece and/or is made of an alloy having a high resistance to aggressive flames such as those of a flame-thrower, a blowtorch or a shaped charge.

By juxtaposing and assembling these elements, particularly light and efficient, flexible armor implements or parts thereof can be constructed. Identical armor elements of a generally polygonal form are hinged to one another along the line of contact defined between the joined polygons.

These elements are thus juxtaposed and assembled together by reciprocal engagement of the hinge lugs of any two adjacent elements, followed by the introduction of high-strength attachment pins or rods into the apertures provided in these lugs and extending parallelly to the related edges of the element.

There is a special advantage in using many small ceramic pieces to cover an area that could be covered by a single large ceramic piece. If a small ceramic piece is broken by a projectile, only the small area it covered gets exposed to future projectiles. The probability of another projectile hitting again in the same small area is very small. In contrast, once a single large ceramic cover gets broken, a much larger area gets exposed.

BRIEF DESCRIPTION OF THE DRAWINGS

FIGS. 10, 11 and 12 illustrate still another embodiment of the armor element according to the invention.

FIG. 13 shows, in detail and in section, the assembly of two such armor elements.

FIG. 14 shows the assembly of four elements according to FIGS. 10 to 13.

FIGS. 15 to 19 which are views respectively similar to FIGS. 10 to 14 show yet another embodiment of the armor element according to the invention.

DETAILED DESCRIPTION OF THE PREFERRED EMBODIMENTS

Further objects, features and advantages of the invention will become apparent from reading the following description, given by way of nonlimitative illustration only.

Figure 1:
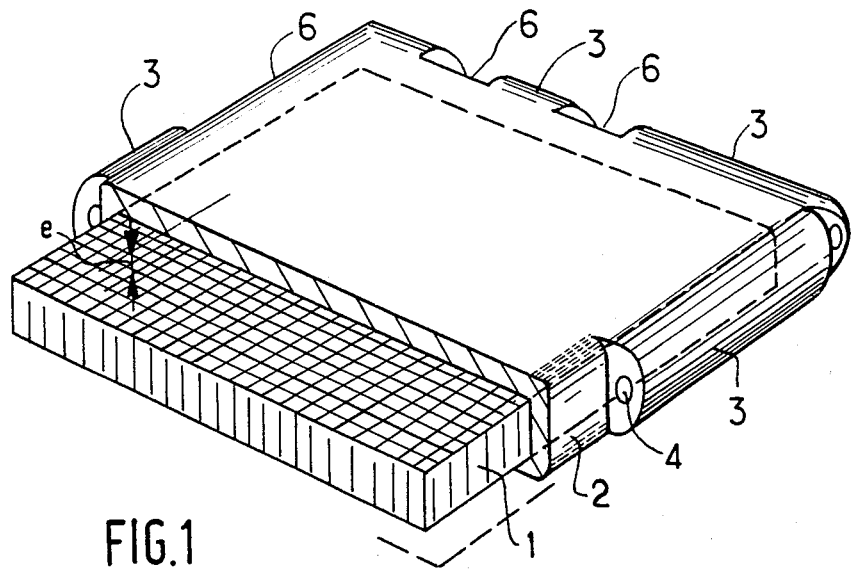
FIG. 1 is a perspective view with a broken-away section of an embodiment of the armor element according to the invention.
Figures 2, 3:
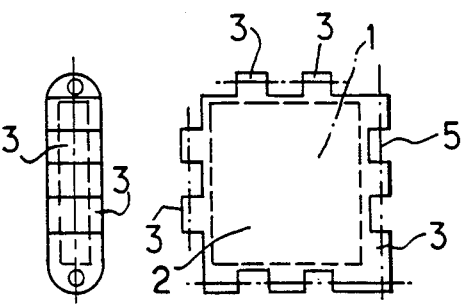
FIG. 2 is a plan view, on a smaller scale, of the element of FIG. 1.
FIG. 3 is a side view of this same element.

In the embodiment shown in FIG. 1, the armor element according to the invention comprises a core 1 constituted by a planar piece of "ballistic" grade ceramic material, i.e. material adapted to resist an impact of a projectile and possibly even to shatter the projectile. This piece will preferably be shaped as tile. It has, for example for flak vest application, a square form of a size of 50 mm×50 mm for a thickness comprised between 4 to 8 mm, depending on the level of protection required. An example of a suitable ceramic is alumina, the denser the better.

Core 1 is entirely covered with an envelope 2 made of an aluminum alloy, also of "ballistic" grade, i.e. effective for braking a projectile and fragments thereof. The thickness e of this envelope is also a function of the level of protection required. It can, for example, lie between 1 and 3 mm.

A preferred specification for an antiballistic metal, e.g. precipitation hardened aluminum, is:
tensile strength$\geq$400 MPa (megapascals)
yield strength$\geq$300 MPa
elongation*$\geq$10%
reduction of area$\geq$18%

*- based on a tensile specimen machined to diameter of 13.8, plus/minus 0.09, millimeters over sufficient distance, e.g. 77 to 98 mm, to encompass a gage length of five times the diameter Envelope 2 is obtained by casting the aluminum alloy all about core 1 which forms an insert, in such a way that the thickness of the envelope is substantially uniform around the insert, in particular on the two main faces of the ceramic piece.

During the cooling after casting of the alloy, the linear shrinking occurring in the alloy causes the alloy to press against the ceramic piece. This results in very tight cohesion between the external surface of the ceramic and the internal surface of the aluminum alloy envelope.

As explained in more detail below, this close contact of envelope 2 with core 1 considerably improves the resistance of the ceramic piece to the impact of a projectile.

On each of its lateral faces, the armor element according to the invention is provided with lugs 3 spaced from each other by recesses 6. These lugs 3 are provided with aperture 4 extending parallelly to the lateral faces of the element and adapted to receive means 5 for attaching the elements together, such as screws, pins or rods made of steel or another high-strength material. Piano wire is a suitable material for means 5. When attached by means 5, the elements are spaced less than the diameter of expected bullets, e.g. to bring neighboring ceramic pieces to within 5 mm for a 7.62 mm armor piercing bullet.

Figure 4:
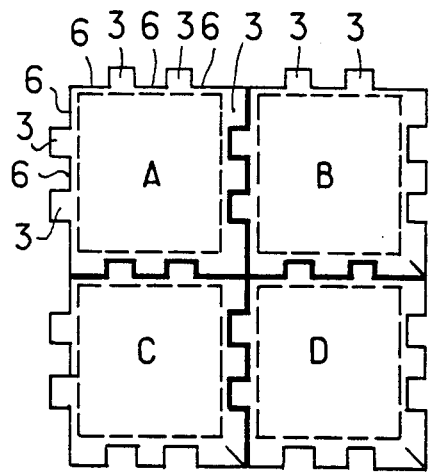
FIG. 4 shows the assembly of four armor elements constituting part of a flexible armor according to the invention.

Lugs 3 and the recesses 6 are so disposed that the respective lugs and recesses of any two elements are complementary and allow mutual overlapping engagement of the said elements as shown in FIG. 4 for four of these elements A, B, C, D. On two opposite sides, each element has three lugs that separate two recesses, and on the two other opposite sides, two lugs between three recesses.

Figure 5:
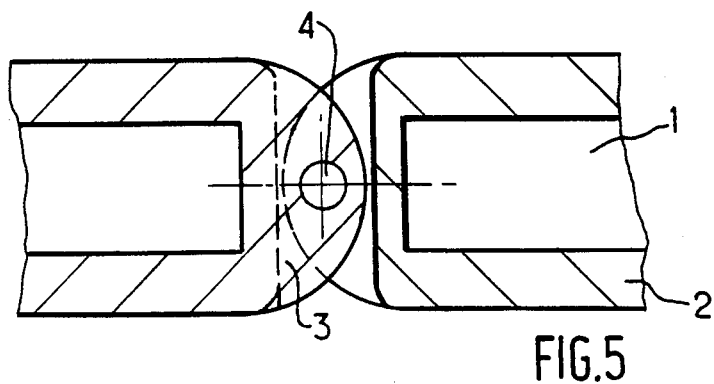
FIG. 5 is a sectional view, showing a detail of the assembly of two elements according to the invention.

The apertures 4 of the adjacent elements are placed in alignment with one another (FIG. 5), following which one introduces therein attachment members 5 as mentioned above. A very strong hinge axis is selected and, between lugs 3 located in the corresponding recesses, a clearance of several tenths of a millimeter is provided to facilitate the relative angular displacement of the elements. The result is a comparatively flexible armor plate.

Figure 6:
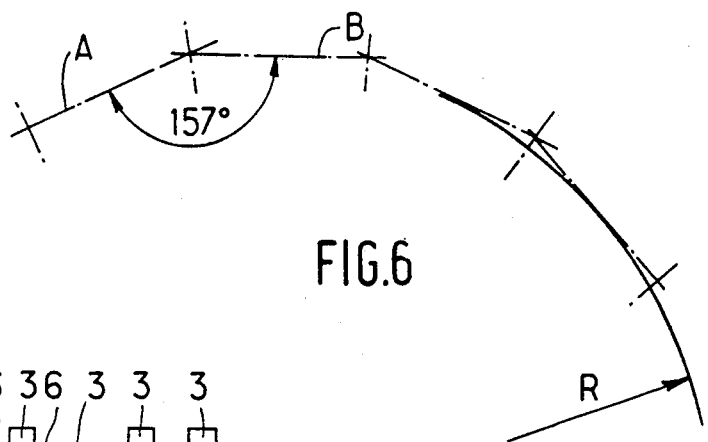
FIG. 6 is a diagram illustrating the possibilities of hinging together the various elements.

FIG. 6 illustrates an embodiment in which two adjacent elements A and B have sufficient clearance to form together an angle of 150° to 157°, for example, so that the flexible armor plate can be wound about a cylinder having a minimum radius R of 73.7 mm.

To assemble armor of large surface area using the elements according to the invention as the basic building blocks, an array having the width of one element and the required length is formed by juxtaposing and hinging said elements to one another. Such an array can then be linked to another array constituted in the same manner as the first-mentioned array. The linking of the arrays can be done by hinging them end to end or side to side.

There can, as well, be more than one plane of these linked arrays, and the planes can be parallel to one another, in contact or closely spaced, and shifted relative to one another, so that areas of articulation in one plane lie centrally relative to the ceramic cores of a neighboring plane, in order to provide protection against projectiles getting through by penetrating areas of articulation.

It is thus possible to obtain lightweight, flexible armor implements which are particularly well adapted to form bullet-proof vests or other protective garments.

The protection ensured is substantially increased by the fact that a high compression stress is generated and acts on the ceramic piece as the envelope is being cast and cooled.

The cast envelope made of ballistic-grade aluminum alloy inhibits shattering of the ceramic piece when a bullet or another projectile strikes it. It additionally tends to catch the ceramic piece, any shattered pieces thereof, the projectile, and fragments and splinters of the projectile, to retard or prevent their scattering from the point of impact with a dangerous velocity depending on the amount of kinetic energy carried and transmitted by the projectile. A very high resistance to penetration of the projectile is thus obtained. This resistance is enhanced by the large impact value (as determined in Charpy or Izod testing) of this alloy of aluminum and by the fact that it sticks to a certain extent to the projectile and brakes it according to well-known antiballistic properties of aluminum alloys such as ARMAIR and AVIOR X alloys (trademarks of Fonderie Alcoa-MG S.A., 38170 Seyssinet, France). Suitable alloy designations of the Aluminum Association, Washington, D.C. are aluminum casting alloys 201 and 206.

AVIOR X alloy has impact values in the Charpy test, unnotched test bar of 8×8 mm, of 11 daJ/cm$^2$, in the case of a separately cast test bar, and 9 daJ/cm$^2$, for a cast-on test bar or a test bar cut from a casting. Impact values like these are obtained by alloys that meet the antiballistic specifications given above for tensile strength, yield strength, elongation, and reduction in area.

Figure 7:
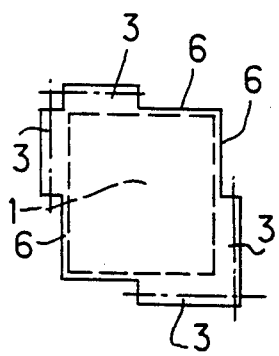
FIGS. 7, 8 and 9, which are views respectively similar to FIGS. 2, 3 and 4, show another embodiment of the armor protection element according to the invention.
Figure 8:
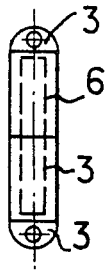
Figure 9:
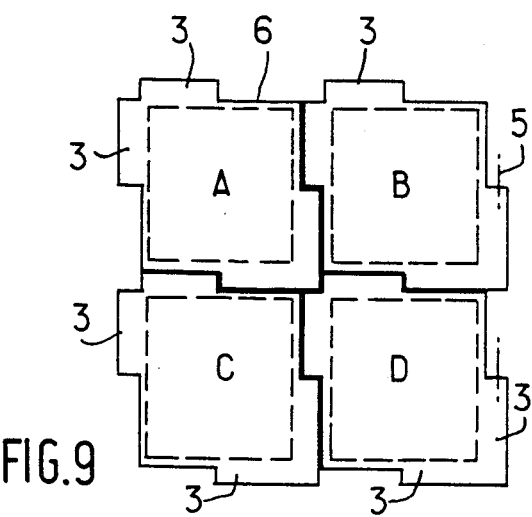
Figure 23:
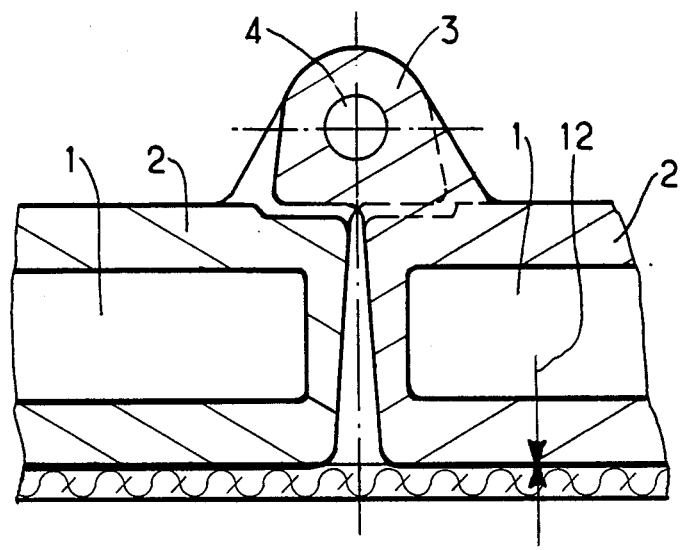
FIGS. 20 to 24 are also views respectively similar to FIGS. 10 to 14 and show a different embodiment of the armor element according to the invention.
Figure 20:
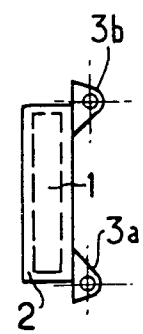
Figure 22:
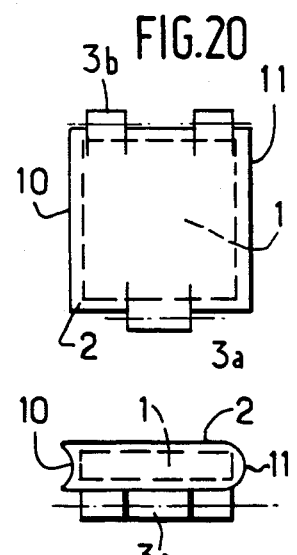
Figure 24:
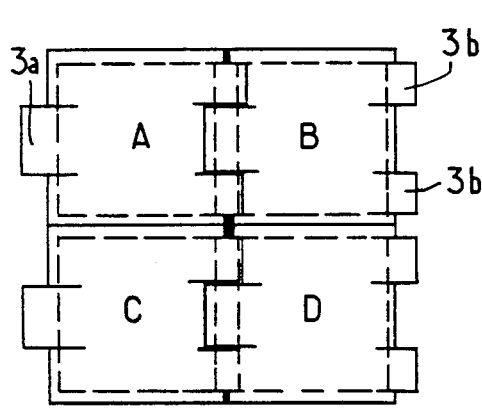
Figure 21:
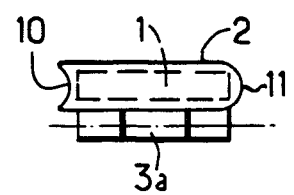

FIGS. 7 to 9 illustrate an embodiment of the armor element according to the invention, the same references and the same assembly modes as described hereinabove being utilized for similar components.

In this embodiment, each element has a single lug 3 on each of its lateral faces.

Due to this fact, it is necessary to utilize more resistant assembly or hinge pins 5, since they are subjected to greater shear stress. However, the lugs 3 of this variant being relatively larger, they are also more resistant than the lugs of the first embodiment and lead to an improved durability of the aluminum alloy.

Another embodiment of the armor element according to the invention is illustrated in FIGS. 10 to 14; as specified hereinabove, the same references designate components similar to those in the previously described armor elements.

Each element comprises on two adjacent lateral faces a single lug 3a, and on each one of the other two lateral faces, two lugs 3b. Each of these lugs has an aperture 4 adapted to receive one of the assembly pins; and during the assembly of such elements, for example, the assembly of four elements A, B, C, D, as represented in FIG. 14, a single lug 3a of one of the plates is placed between two lugs 3b of the adjacent plate.

While, in the armor elements described previously, the assembly lugs 3 are located in the plane of the elements, in the present variant lugs 3a and 3b are projecting with respect to one of the faces of the elements. The hinge and assembly axes centered in apertures 4 are thus located at a certain distance above the corresponding face and slightly shifted towards the outside of the element. A greater articulation latitude, or hinging angle, results (FIG. 13).

A different embodiment of the armor element is represented in FIGS. 15 to 19. As in the above-described examples, each element comprises a core 1 essentially entirely covered with an envelope 2 made of ballistic-grade aluminum alloy, this covering being obtained by casting as already indicated.

With a view to allowing the armor elements to be hingedly connected to one another so as to constitute plates, each element presents, on two of its adjacent lateral faces, a concave profile providing a recess 10 having a semicircular profile and, on its two other lateral faces, a convex profile 11 complementary to the concave profile. The fitting of the profile 11 into profile 10 provides an articulation about which the elements thus placed in a close relationship can flex.

For maintaining the elements in position relative to one another, they are joined by means of a textile cloth 12 glued onto a main face of each (FIG. 18). A cloth is selected that has a texture which is sufficiently elastic to allow for the desired angular displacement.

The variant shown in FIGS. 20 to 24 is an intermediary or combined solution with respect to the two preceding embodiments.

Indeed, each element here comprises, on two opposite facing lateral faces, a single central lug 3a and two separated lugs 3b, respectively, and on the two other lateral faces, a concave profile 10 and a complementary convex profile 11.

For building a plate from these elements, arrays of elements assembled by their lugs 3a, 3b are constructed by means of pins passing through the apertures of these lugs, all the concave profiles 10 and all the convex profiles 11 of the elements being located on the same respective side of the array.

Successive arrays of elements are "nested" or fitted together by their complementary profiles, the cohesion of the assembly being obtained by gluing the elements on a cloth 12 as in the preceding example.

Figure 25:
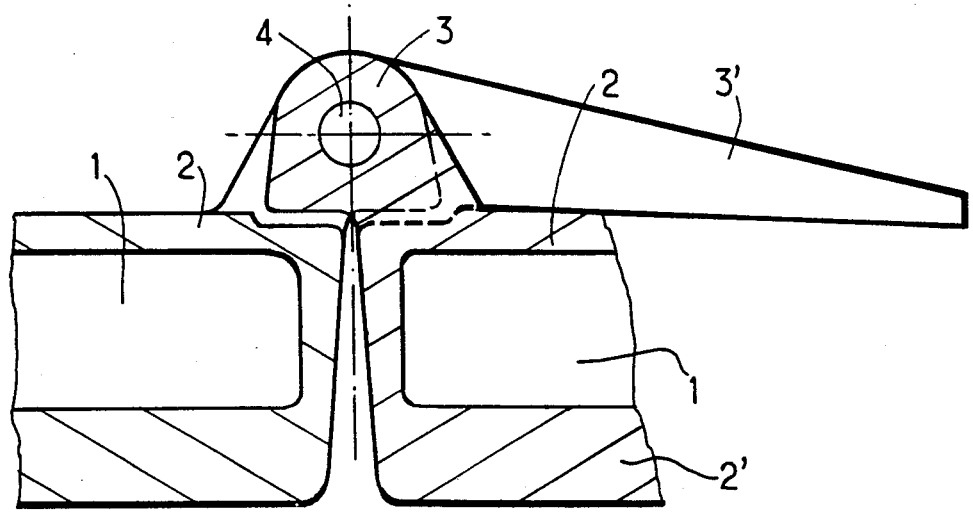
FIGS. 25 and 26 show an embodiment similar to that of FIGS. 20 to 24, with a difference, however, that the assembly lugs comprise strengthening ribs.
Figure 26:
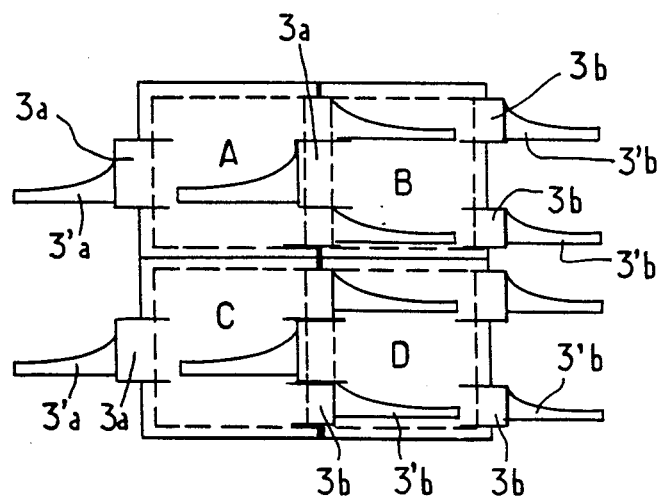

The embodiment represented in FIGS. 25 and 26 corresponds to the embodiment of FIGS. 20 to 24, however, modified in that:
  the thickness of the aluminum layer with which the front face 2 is covered is smaller than the thickness of the aluminum layer of the rear face 2'.
  hinge lugs 3 include strengthening ribs 3', central lugs 3a and lugs 3b are extended by strengthening ribs 3'a and 3'b respectively, cast integrally with the said lugs.

Furthermore, the textile cloth 12 is not used in this embodiment, although it can be added in the case of utilization of the armor element in a bullet-proof vest.

It is to be understood that the embodiments described and shown are given by way of example only, and that the armor element according to the invention can be the object of numerous other variants, involving especially the form of the ceramic planar piece and, consequently that of the envelope that covers it.

Rectangular or hexagonal armor elements can thus be manufactured that are assembled together in a network like fashion.

The armor element according to the invention can have larger dimensions, in particular as regards the thickness of the ceramic square piece, than those that have been mentioned hereinabove. The armor implement according to the invention can be utilized to protect materiel, such as vehicles, against projectiles (particularly perforating bullets), shaped charges, shrapnel, and the like. It is also useful for application to doors of safes for keeping money and the like.

The armor elements can be assembled to form complex protection-systems such as those required for military helmets, or those of motorcyclists, where the possible impact is brought about by the activities of the person wearing the helmet. The armor element can be effective at the same time to provide protection against flames, especially aggressive (i.e. high temperature, high velocity—e.g. oxyhydrogen or oxyacetylene) flames such as those of flame-throwers, blowtorches or shaped charges.

It is also possible to assemble armor elements of different dimensions. Therefore, a bullet-proof vest constructed according to the invention can be constituted by small-sized armor elements located in areas of small-radius curvature such as those enveloping the members, and by wider and for larger elements located in zones ensuring the protection of the front or back.

The assembly of large-size elements (the alloy covering and/or the ceramic square pieces of which can, furthermore, present a greater thickness by way of compensation) offers a protection substantially as efficient for a cost per unit area substantially lower, as compared to those used in areas of small-radius curvature. It is even possible to utilize armor implement portions according to the invention to connect large-size steel armor plates to each other to build, for example, the body of a vehicle.

Suitable permanent mold practice for casting antiballistic aluminum envelopes on planar ceramic cores for making the armor elements of the invention includes placing the core on against three separated pins (three points define a plane) in the lower half of the mold, closing the upper half of the mold against the lower half, with a single pin on the upper half bearing against the core to hold it in place against the three pins in the lower half. The mold and core are then preheated to about 200° C., or about 350° F. The temperature of the Al at time of pouring should be about 800° F. for flak vest elements. For thicker embodiments, such as for armored vehicle application, Al metal temperature at pouring can be lower. Permanent mold practice inherently has a faster cooling rate than e.g. sand casting; this is helpful in obtaining a quicker shrinking of the Al alloy to bring the envelope into the desired condition of pressing against the ceramic core.

While the invention has been described in terms of preferred embodiments, the claims appended hereto are intended to encompass all embodiments which fall within the spirit of the invention.

What is claimed is:

1. In a method of providing anti-projectile armoring protection to an object, the improvement comprising placing a plurality of armor element tiles side by side to form a layer for protecting the object, without there being a continuous cast matrix between the tiles, each of the tiles comprising a ceramic core and a cast metallic envelope pressing against the ceramic core.

2. The method of claim 1, wherein the metallic envelope is an aluminum alloy.

3. The method of claim 1, wherein each of said armor element tiles further comprises integrally formed hinge lugs on its lateral faces, said hinge lugs having through-holes formed therethrough, wherein the hinge lugs of adjacent armor element tiles are interlocked and connected by hinging members through the thus-interlocked hinge lugs.

4. The method of claim 1, wherein the armor element tiles are affixed to a textile cloth.

5. The method of claim 1, wherein the thickness of the metallic envelopes at the edges of the tiles is sufficiently small so that the ceramic cores of adjacent tiles are spaced closely enough together to provide protection against projectiles striking areas between adjacent tiles.

6. In an object having armoring to provide anti-projectile armoring protection, the improvement comprising a plurality of armor element tiles placed side by side to form a layer for protecting the object, without there being a continuous cast matrix between the tiles, each of the tiles comprising a ceramic core and a cast metallic envelope pressing against the ceramic core.

7. An object as claimed in claim 6, wherein the metallic envelope is an aluminum alloy.

8. An object as claimed in claim 6, wherein each of said armor element tiles further comprises integrally formed hinge lugs on its lateral faces, said hinge lugs having through-holes formed therethrough, wherein the hinge lugs of adjacent armor element tiles are interlocked and connected by hinging members through the thus-interlocked hinge lugs.

9. An object as claimed in claim 6, wherein the armor element tiles are affixed to a textile cloth.

10. The object of claim 6, wherein the thickness of the metallic envelopes at the edges of the tiles is sufficiently small so that the ceramic cores of adjacent tiles are spaced closely enough together to provide protection against projectiles striking areas between adjacent tiles.

* * * * *